Figure 1:
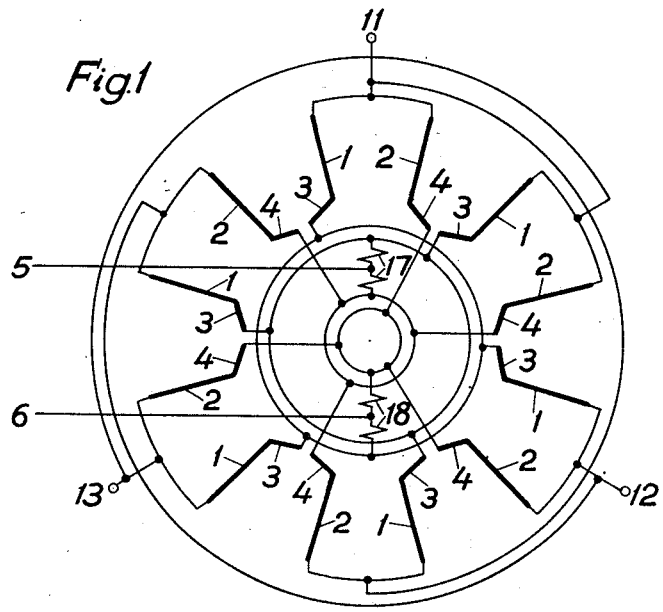

June 2, 1953 H. M. SÖRENSEN ET AL 2,640,963
SPARE CONNECTED POLYPHASE TRANSDUCTOR
Filed June 14, 1949 3 Sheets-Sheet 1

Inventors
Harry Forssell and
Harald M. Sörensen.
By James Aiken
Attorney.

Inventors
Harry Forssell
and
Harald M. Sörensen
By
Attorney.

Patented June 2, 1953

2,640,963

UNITED STATES PATENT OFFICE 2,640,963

SPARE CONNECTED POLYPHASE TRANSDUCTOR

Harald M. Sörensen, Fruens Boge, Denmark, and Harry Forssell, Ludvika, Sweden, assignors to Allmanna Svenska Elektriska Aktiebolaget, Vasteras, Sweden, a corporation of Sweden Application June 14, 1949, Serial No. 98,974
In Sweden June 16, 1948

2 Claims. (Cl. 323—89)

The specification of U. S. Patent No. 2,372,112 describes direct current saturable inductances in which the direct and alternating currents traverse the same windings and in which the number of pulsations induced in the direct current paths during each cycle of the alternating current is equal to twelve. For direct current saturable inductances in general, the expression "transductors" is hereinafter used for the sake of brevity, and such inductances, in which the direct current and alternating current traverse the same windings, are hereinafter referred to as "spare-connected." For $n$ pulsations of the direct current during each cycle of the alternating current, the transductor is hereinafter referred to as "$n$-pulse." When such transductors are employed as independent units, for instance for compensating the capacitance of a high voltage three phase system, it has been found desirable to connect the parts of a transductor as thus specified in such manner as to be traversed by essentially the same direct current, while the alternating current voltages therein are independent of one another. If, for obtaining a number of pulses higher than twelve, more than two direct current circuits are employed, the same conditions are applicable. When a transductor forming a unit of the character described is composed of two or more parts, each of which forms a complete transductor, the said parts are hereinafter referred to as "partial transductors."

Such a mutual independence of the partial transductors constituting together the polyphase transductor of a number of pulses of twelve or more, may be effected by means of interphase transformers, the windings of which are connected in the different current branches, preferably at the neutral points thereof.

Another way of obtaining the desired independence of the voltages of the partial transductors is to connect them in series on the direct current side instead of in parallel and to connect, at the same time, the transductors to different current sources on the alternating current side. It is a well-known fact per se, that a series connection of alternating current members is in certain respect equivalent to their connection in parallel through interphase transformers, it being common to both connections that the units connected together are traversed by equal currents while their alternating current voltage components will be independent of one another.

Still another way of obtaining the desired mutual independence of the partial transductors is to connect them to entirely separate alternating current sources, for instance to separate phase windings of a transformer which are not even connected together at their neutral points.

The present invention comprises the use of the above specified connections in such transductors of a high number of pulses, each of which consists of at least two partial transductors having different phase angles of the main magnetic fluxes and in which at least parts of the alternating current windings are traversed by magnetizing direct currents.

Figure 2:
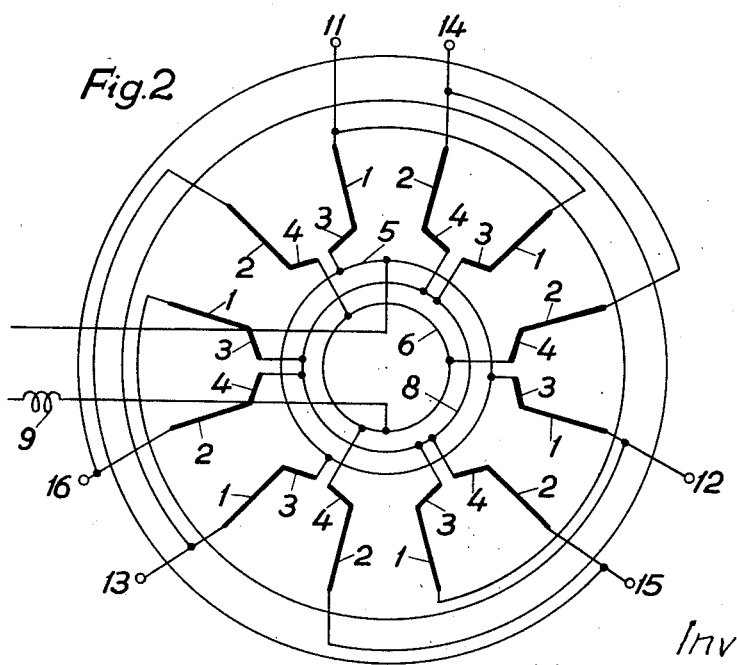
Figure 3:
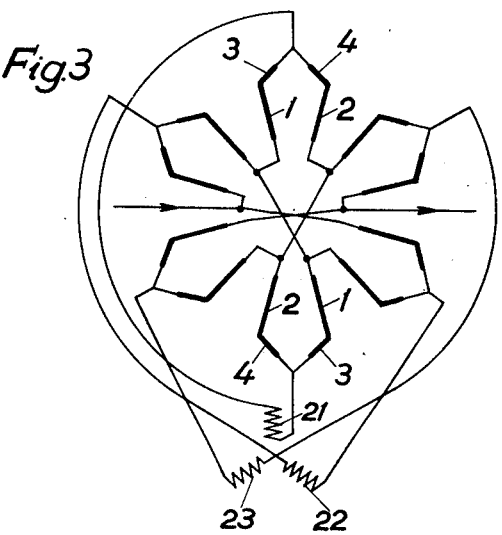

Different forms of the invention are diagrammatically illustrated in Figs. 1–3 of the accompanying drawing.

Figs. 1–3, inclusive, have been drawn according to the same principle as has been employed in Figs. 2 and 3 of the patent specification 2,372,112, while in Figs. 4–8 the windings are shown substantially in the conventional manner. The transductor of Figs. 1 and 2 can be regarded as composed of two six-pulse partial transductors, the voltage vectors of which are mutually displaced by 30°. In Fig. 1, these partial transductors are connected in parallel to the alternating current terminals, while in Fig. 2, they are connected each to one of two transformer windings of equal phase. In both figures, the longer winding element of one of the partial transductors is designated by 1 and its shorter winding element by 3, while the corresponding winding elements of the other partial transductor are designated by 2, 4, respectively. In Fig. 1, one direct current terminal 5 is connected to the midpoint of an interphase transformer 17 having on a common core two windings the direct current ampereturns of which oppose each other, while the outer terminals of the said interphase transformer are connected each to one of the neutral points of the two six-pulse partial transductors. The outer terminal of the interphase transformer in Fig. 1 is thus connected to one neutral point of the six-pulse transductor formed by the winding elements 1 and 3, while the inner end of the interphase transformer in Fig. 1 is connected to the six pulse transductor formed by the winding elements 2 and 4. The other direct current terminal is connected to the midpoint of an interphase transformer 18, the two outer terminals of which are connected each to another neutral point of a six pulse partial transductor. The interphase transformers connected in this way serve to absorb the voltage waves of the fundamental frequency of the alternating current by which the voltages in the partial transductors, displaced by 30°, differ, so that these partial transductors may operate quite independent of one another as regards the voltages.

In Fig. 2, a similar independence has been obtained by causing the direct current to traverse the alternating current windings of the two partial transductors in series. One direct current terminal is here represented by the circle 5 and the other by the circle 6, while the intermediary circle 18 represents a neutral point of each partial transductor.

The direct current circuit preferably also contains a reactor 9 for absorbing the higher harmonics which are common to both six pulse transductors and thus are not neutralized by the interphase transformer connection. The two partial transductors are here, as already mentioned, connected to two current sources of equal phase on the alternating current side, for instance to two windings on a common transformer. The points of connection to these current sources are designated by 11, 12, 13 for the one and by 14, 15, 16 for the other partial transductor.

Following a current path from one direct current terminal 5 to the other terminal 6, the current first traverses a winding element 3, then an element 1, then follows a semicircle in the diagram to the diametrically opposite point, further traverses another element 1 and an element 3 to the circle or bus bar 8, to which three connections from each of two three phase stars lead, further traverses an element 4 and an element 2, a semicircle to the opposite element 2 and finally this element and an adjacent element 4 to the other direct current terminal 6. The two six pulse partial transductors differing 30° in phase are thus connected in series for the direct current and are at the same time connected to different alternating current terminals of equal phase.

In Fig. 3, the shorter winding elements 3 and 4 are connected adjacent to the alternating current terminals while the longer winding elements are connected adjacent to the direct current terminals. This modification with respect to Figs. 1 and 2 is unessential and may as well be applied to the connections otherwise shown in Figs. 1 and 2. The essential difference between Fig. 3 on the one hand and Figs. 1 and 2 on the other is that in Fig. 3 the three alternating current phases are fed from three entirely separated transformer windings 21, 22, 23. Following the alternating current from for instance the upper terminal of the winding 21, the said current first traverses two winding elements 3, 4 in parallel, then two windings 1, 2 in parallel, further two corresponding pairs of elements of opposite phase and finally to the lower terminal of the winding 21. The course will be analogous for the two other phases. The direct current flows in two parallel branches, one through each group of four winding elements and one through the opposite group.

Each pair of immediately connected winding elements forming an angle of 120°, for instance 1 and 3 or 2 and 4, may belong to different three phase stars, as described in the patent application Serial No. 88,649, now Patent No. 2,599,137.

Figure 4:
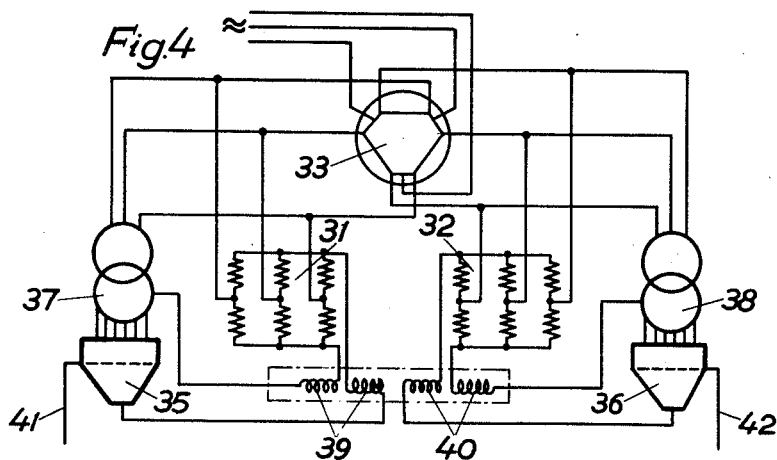

In Fig. 4, two equal six pulse spare-connected transductors 31 and 32 are connected on their alternating current side to a common phase-splitting transformer 33 fed from a three phase line. The transformer is so connected that the two three phase systems fed therefrom are mutually displaced in phase by 30°. The transductors are fed on the direct current side from two separate current sources shown as rectifiers comprising valve vessels 35, 36 and transformers 37, 38 which, by way of example, are connected to the same alternating current terminals as the corresponding transductors. In such a connection, the reaction of the rectifiers on the line will be twelve pulse, even though each rectifier is only six pulse. A series reactor 39 is connected between each terminal of the rectifier 35, 37 and the corresponding direct current terminal of the transductor 31, and corresponding series reactors 40 are connected between the terminals of the rectifier 36, 38 and of the transductor 32. All the reactors 39 and 40 may be mounted on a common iron core if they only are wound to cause their direct current ampereturns to oppose each other. In such case the total kva. number of the reactors will be lowered and the instantaneous variations of the direct currents will follow each other. The two direct current systems may be connected together at one point outside the reactors, for instance at the cathodes of the rectifiers. The rectifiers may be grid controlled, as diagrammatically indicated by conductors 41 and 42, for controlling the direct current magnetisation of the transductors.

In this case, the independence of the alternating current voltages in the two partial transductors 1 and 2 has been obtained by the feeding of the two transductors from separate direct current sources. For obtaining a perfect symmetry, the direct currents of the two sources should preferably be controlled to equal values, for instance by means of the grid control of the rectifiers.

Figure 5:
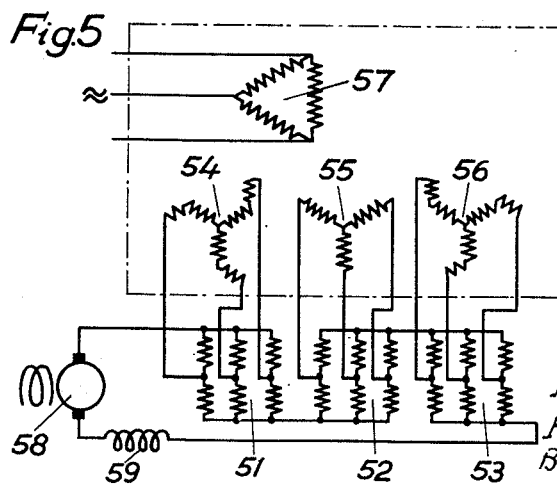

Fig. 5 shows a connection having the number of pulses 18, obtained by means of three spare-connected six pulse transductors 51, 52, 53, fed from three separate phase-displacing secondary windings 54, 55, 56 of a three phase transformer the primary winding 57 of which is delta-connected. On the direct current side, the partial transductors are connected in series to a common current source shown as a generator 58, the connection including also a series reactor 59. The phase displacement of 20° between the three partial transductors is obtained by a zigzag connection of two of the secondary windings of the transformer.

Figure 6:
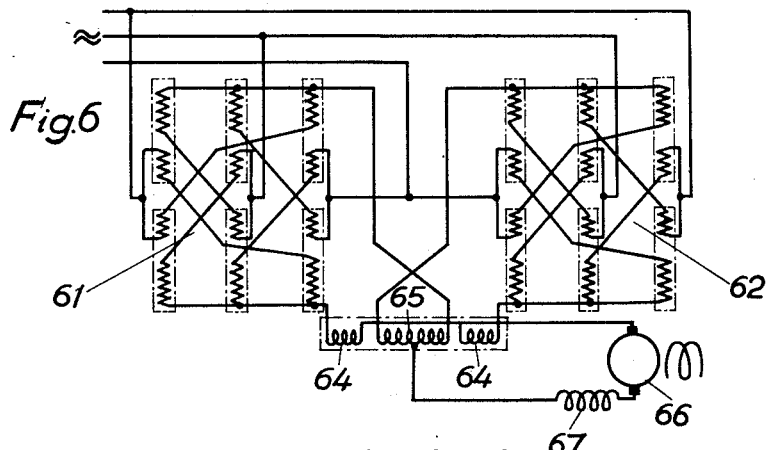

Fig. 6 shows a twelve pulse transductor, in which the partial transductors 61, 62 are zigzag connected substantially as described in the application Serial No. 88,649. On the direct current side, the partial transductors are fed from a common direct current source, shown as a generator 66, through an interphase transformer 64, 65, as in Fig. 1, and through a series reactor 67. The principal difference with respect to Fig. 1, except as regards the conventional way of showing the winding elements, is that the two interphase transformers of Fig. 1 have been united in one, having a common core, in Fig. 6.

Figure 7:
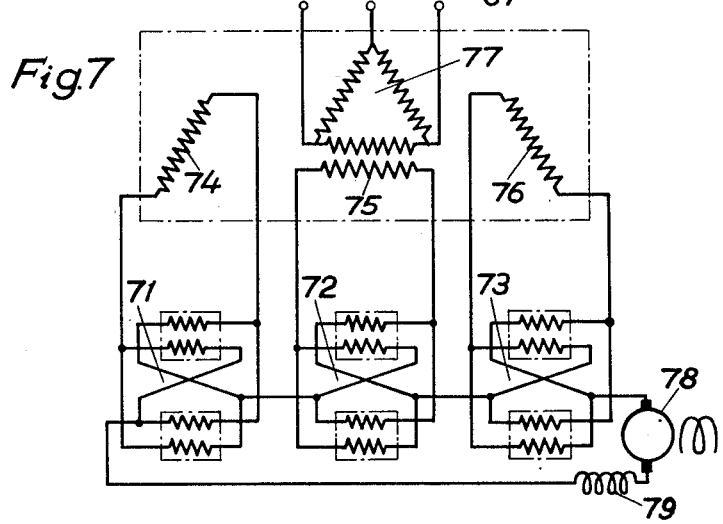

In Fig. 7, a six pulse transductor is built up from three two pulse spare-connected partial transductors 71, 72, 73, each of which is fed from a separate single phase secondary winding 74, 75, 76 respectively on a three phase transformer having a delta-connected primary winding 77. Hereby the higher harmonics which appear in the alternating current voltages of the two pulse transductors but not in the six pulse ones, and the numbers of which are divisible by three, are short-circuited. On the direct current side, the partial transductors 71, 72, 73 are connected in series and fed from a direct current source 78 across a reactor 79.

Figure 8:
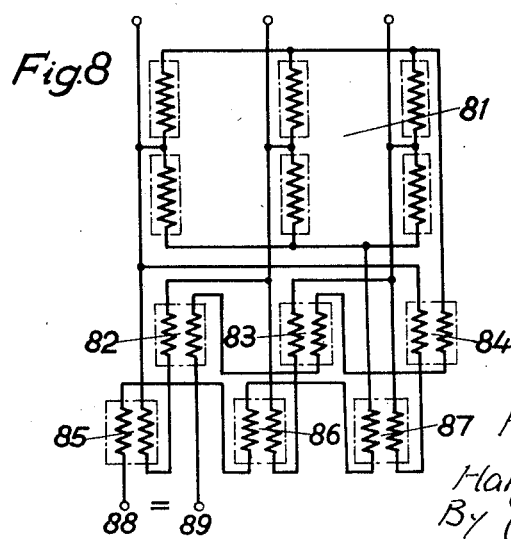

In Fig. 8, finally, a twelve-pulse transductor is composed of one six-pulse spare-connected transductor 81 and one delta-connected group of three pairs of series-connected winding elements 82—87. These six latter elements have separate direct current windings, as a spare connection is not practicable in a delta arrangement. The direct current from one terminal 88 first traverses the direct current windings of the three elements 85, 86, 87 in series, then the spare-connected six pulse transductor 1, and further the direct current windings of the three elements 82, 83, 84, before it reaches the other direct current terminal 89, whereby full symmetry is obtained.

It is common to all the forms illustrated, that the alternating current voltages have one more degree of freedom than in the simple parallel connection according to the specification 2,372,112.

We claim as our invention:

1. A device comprising at least two saturable reactors having windings, a direct current source and a multiphase alternating current source, each of said reactors including at least one winding connected to each phase of said alternating current source, means connecting said direct current source to said windings so that at least parts of the windings of each of such reactors are connected in common to both such sources, means mounting and connecting said reactors in such a way that the voltages in such reactors are displaced in phase with respect to each other, and means so connecting the windings as to maintain the instantaneous direct currents in such common parts substantially equal while the alternating current voltages in such parts are independent of one another.

2. A reactor as claimed in claim 1, in which said reactors are connected in parallel to said direct current source, and interphase transformer means connected between said reactors and the terminals of said direct current source.

HARALD M. SÖRENSEN.
HARRY FORSSELL.

References Cited in the file of this patent
UNITED STATES PATENTS

| Number | Name | Date |
|---|---|---|
| 2,259,711 | Stevens | Oct. 21, 1941 |
| 2,372,112 | Nordfeldt | Mar. 20, 1945 |
| 2,471,411 | Claesson | May 31, 1949 |